(12) United States Patent
Kisra et al.

(10) Patent No.: US 7,107,153 B2
(45) Date of Patent: Sep. 12, 2006

(54) DATA COMPRESSION METHODS AND SYSTEMS

(75) Inventors: Saad Kisra, Sagamihara (JP); Henri-Pierre Valero, Danbury, CT (US)

(73) Assignee: Schlumberger Technology Corporation, Sugar Land, TX (US)

( * ) Notice: Subject to any disclaimer, the term of this patent is extended or adjusted under 35 U.S.C. 154(b) by 104 days.

(21) Appl. No.: 10/848,806

(22) Filed: May 19, 2004

(65) Prior Publication Data

US 2005/0222775 A1 Oct. 6, 2005

Related U.S. Application Data

(60) Provisional application No. 60/558,974, filed on Apr. 2, 2004.

(51) Int. Cl.
*G01V 1/22* (2006.01)
*G01V 3/34* (2006.01)

(52) U.S. Cl. .......................................................... 702/6

(58) Field of Classification Search .................... 702/9, 702/6, 7, 8
See application file for complete search history.

(56) References Cited

U.S. PATENT DOCUMENTS 5,519,668 A * 5/1996 Montaron .................... 367/35
6,021,198 A 2/2000 Anigbogu
6,125,078 A 9/2000 Ooishi et al.
6,229,453 B1 * 5/2001 Gardner et al. .......... 340/853.8
6,272,445 B1 * 8/2001 Cheale et al. ................ 702/187
6,301,551 B1 * 10/2001 Piscalko et al. ............. 702/188
2004/0093364 A1 * 5/2004 Cheng et al. ................ 708/203

FOREIGN PATENT DOCUMENTS

EP 0 684 490 A2 11/1995
WO WO 03/079039 A2 9/2003

* cited by examiner

*Primary Examiner*—Donald McElheny, Jr.
(74) *Attorney, Agent, or Firm*—Karan Singh; Bill Batzer; Dale Gaudier

(57) ABSTRACT

The present invention is directed to methods and systems for taking measurements relating to subterranean formations. The methods and systems effectively compress data and thus facilitate more efficient data transmission. The methods and systems are capable of automatically varying data compression rates during a measurement operation. The variable data compression capability facilitates reliable collection of measurement data at faster and/or constant logging speeds. The data compression methods and systems may be applied to any measurement operation relating to subterranean formations, including, but not limited to: acoustic wireline logging measurements, acoustic logging-while-drilling measurements, electromagnetic measurements, nuclear magnetic resonance measurements, and resistivity measurements.

43 Claims, 13 Drawing Sheets

DATA COMPRESSION METHODS AND SYSTEMS

RELATED APPLICATIONS

This claims priority of U.S. Provisional Patent Application Ser. No. 60/558,974 filed 2 Apr. 2004.

FIELD OF THE INVENTION

The present invention relates generally to methods and systems for investigating subterranean formations. More particularly, this invention is directed to methods and systems for compressing data such as subterranean formation data.

BACKGROUND OF THE INVENTION

The investigation of subterranean formations is a common occurrence in oil and gas exploration and production operations. Methods and tools for investigating subsurface formations have advanced considerably over the years. There are many commercially available acoustic, nuclear, electromagnetic, and resistance tools that provide a variety of information about formations adjacent to a borehole. For example, some recent wireline sonic logging tools can achieve full formation characterization.

For sonic logging tools, one of the important improvements in formation evaluation has been the increase in the number receivers and transmitters. Some current sonic logging tools have dozens of receivers or more, which are located both longitudinally and azimuthally around a receiver sonde. In addition, some sonic tools include multiple monopole and dipole sources, each capable of firing pulses at different frequencies. These advances in hardware have proven important for a better understanding of formations surrounding boreholes, especially for complex environments such as altered or anisotropic formations. Such complex environments require the collection and transmission of very large amounts of data.

However, the tradeoff for better formation evaluation during recent years is reduced logging speed. Transmitting large amounts of data often requires a decrease in logging speed. Communication bandwidth is limited, especially in a subterranean measurement environment. Therefore, the limiting factor in many subterranean measurement operations is the communication capability. Accordingly, in order to send the large amounts of data generated by recent formation measurement systems, slower measurement-taking speeds are required, and slower measurement-taking speeds result in longer operations and increased rig time. Longer operations and increased rig time result in additional expenses. Consequently, there is a need for data compression methods and systems to enable more efficient communication between subterranean measurement tools and surface apparatus.

The present invention is directed to overcoming, or at least reducing the effects of, one or more of the problems outlined above.

SUMMARY OF THE INVENTION

The present invention meets the above-described needs and others. Specifically, the present invention provides methods and systems for taking measurements relating to subterranean formations, such as logging subterranean formations. The methods and systems, however, effectively compress data and thus facilitate more efficient data transmission. The methods and systems are capable of automatically varying data compression rates during a measurement operation. The variable data compression capability described herein facilitates reliable collection of measurement data at constant logging speeds. Further, the data compression methods and systems of the present invention may be applied to any measurement operation relating to subterranean formations, including, but not limited to: acoustic wireline logging measurements, acoustic logging-while-drilling measurements, electromagnetic measurements, nuclear magnetic resonance measurements, and resistivity measurements.

Application of the principles of the present invention provides a method of effectively compressing data. According to some aspects, the invention provides a method of taking measurements relating to a subterranean formation, comprising automatically compressing measurements data at variable compression rates as the measurements are taken. The compression rates may be varied depending on external constraints of a measurement process. For example, the external constraints may include logging speed, drilling speed, telemetry bandwidth, and data size per distance (depth) of borehole traversed. The variable compression rates may include a combination of lossless compression and lossy compression.

According to some aspects, the lossless compression comprises compressing the measurements by linear predictive coding, compressing the measurements by differential coding, determining which of the linear predictive and differential coding provides higher compression, and reporting only the higher compression measurements. The lossless compression may also include segmenting the measurements into smaller blocks prior to the linear predictive coding or differential coding operations. The segmenting may comprise applying fixed-length windows to the measurements, segregating different components present in the measurements, or other segmenting procedures. The different component may be segregated by detecting a first break of different components present in a waveform.

According to some aspects, the lossy compression comprises quantization. The quantization may include calculating a quantization step that maximizes compression ratio while maintaining at least a predetermined signal-to-noise-compression-ratio.

According to some aspects, the variable compression rates comprise a first range of compression rates for measurement signals having an amplitude within a first range, and a second range of compression rates for measurement signals having an amplitude within a second range.

The principles of the present invention also provide a method of taking measurements relating to a subterranean formation comprising applying an algorithm that automatically varies a data compression rate of the measurements relating to a subterranean formation. The algorithm may compress the measurements according to two or more data compression methods in parallel and report only data having the highest compression rate achieved by the one of the two or more data compression methods. The measurements may comprise logging measurements and the algorithm may automatically determine the data compression rate sufficient to maintain a substantially constant logging rate. The data compression rate may comprise a combination of lossless and lossy compression.

The principles of the present invention also provide a method of taking subterranean measurements comprising determining an approximate telemetry bandwidth, assigning a minimum acceptable signal-to-compression-noise ratio, creating multiple modes of data compression with a lossless lower mode and a lossy upper mode at extents of the multiple levels, compressing measurements taken according to an initial compression rate, comparing a signal-to-compression-noise ratio of the compressed measurements to the minimum acceptable signal-to-compression-noise ratio, changing the compression mode to a higher compression rate of no higher than the lossy upper mode extent if the signal-to-compression-noise ratio is above the minimum acceptable signal-to-compression-noise ratio, and changing the compression mode to a lower compression rate of no lower than the lossless lower mode extent if the signal-to-compression-noise-ratio is below the minimum acceptable signal-to-compression-noise ratio. Many of the method steps may be repeated multiple times. For example, each of the steps beginning with compressing measurements may be repeated for each waveform in an acoustic logging operation. According to some aspects, the multiple modes of data compression are quantized. According to some aspects, the initial compression rate comprises the lossless lower mode.

The principles of the present invention also provide a method of taking measurements relating to a subterranean formation comprising automatically compressing measurement data at variable rates to provide data of at least a predetermined quality at a substantially constant logging rate. The variable compression rates may comprise at least one lossless compression rate and at least one lossy compression rate. The at least one lossless compression rate may be achieved by segmenting the measurements into blocks, compressing the segmented blocks by linear predictive coding, compressing the segmented blocks by differential coding, determining which of the linear predictive and differential coding provides higher compression, and reporting only the higher compression segmented blocks.

The principles of the present invention also provide a method of taking subterranean measurements comprising evaluating incoming subterranean measurement data, and automatically determining whether to compress the data losslessly or in a lossy manner. The automatically determining may comprise compressing the incoming subterranean measurement data at a default compression rate, comparing a signal-to-compression-noise ratio of the compressed data to a predetermined minimum signal-to-compression-noise ratio, changing the default compression rate to lossless if the signal-to-compression-noise ratio of the compressed data is less than the predetermined minimum signal-to-compression-noise ratio, changing the default compression rate to lossy if the signal-to-compression-noise ratio of the compressed data is greater than a sum of the predetermined minimum plus and a predetermined additional factor.

The principles of the present invention also provide a method of taking measurements comprising compressing measurement data with a linear predictive coding function, compressing the measurement data with a differential coding function, determining which of the linear predictive coding and differential coding functions provides higher compression, and reporting only the higher compression data. The compressing of the measurement data by the linear predictive coding and differential coding functions is preferably performed in parallel.

The principles of the present invention also provide a method of manipulating data comprising compressing the data in parallel by multiple compression methods, comparing the compressed data, and reporting only the compressed data with the highest compression rate.

The principles of the present invention also provide a system for taking measurements relating to a subterranean formation comprising a measurement tool, a computer in communication with the measurement tool, and a set of instructions executable by the computer that, when executed, automatically compresses measurement data at variable compression rates as the measurements are taken.

The principles of the present invention also provide a computer readable storage device encoding a program of instructions including instructions for automatically compressing measurement data at variable compression rates as the measurements are taken related to a subterranean formation.

Additional advantages and novel features of the invention will be set forth in the description which follows or may be learned by those skilled in the art through reading these materials or practicing the invention. The advantages of the invention may be achieved through the means recited in the attached claims.

BRIEF DESCRIPTION OF THE DRAWINGS

The accompanying drawings illustrate preferred embodiments of the present invention and are a part of the specification. Together with the following description, the drawings demonstrate and explain the principles of the present invention.

Throughout the drawings, identical reference numbers designate similar, but not necessarily identical, elements.

DETAILED DESCRIPTION OF THE PREFERRED EMBODIMENTS

Figure 1:
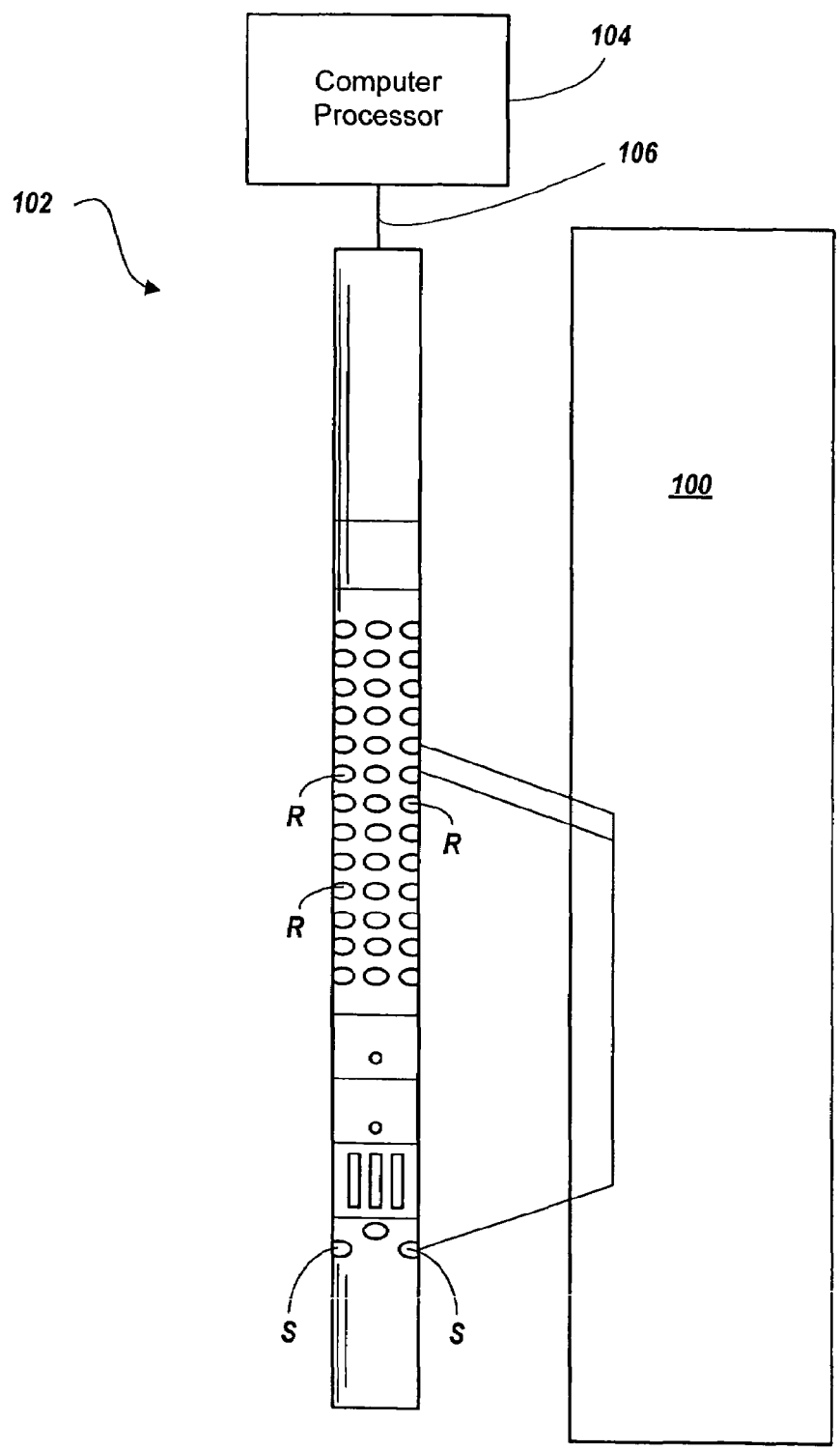
FIG. 1 a measurement system according to one embodiment of the present invention.

Illustrative embodiments and aspects of the invention are described below. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

The present invention contemplates automatic compression rate variations for data compression rate measurements relating to a subterranean formation. As mentioned above, measurements data levels have become sufficiently high in modern oilfield tools so as to become a limiting factor in many measurement operations. For example, the logging speed of some wireline logging tools must be reduced or changed during the logging operation in some instances to ensure that all of the data is collected and transmitted uphole, prior to the present invention. The present invention provides methods and systems for variably compressing measurements data to provide quality data without requiring adjustments to external measurement parameters such as logging speed, drilling speed, telemetry bandwidth, data size per distance, etc. The methods and systems may be particularly well suited to acoustic wellbore logging with a sonic logging tool. However, the methods and systems presented herein are not so limited. For example, the methods and systems may be applied to resistivity logs, nuclear magnetic resonance measurements, electromagnetic measurements, vertical seismic profiles, check-shot surveys, or other applications such as logging while drilling (LWD), measurement while frilling (MWD), permanent monitoring, semi permanent monitoring, fracture monitoring (including hydrofrac monitoring), temperature monitoring and pressure monitoring. In a broader sense, the techniques described herein can also be applied to measurements relating to subterranean hydrocarbon reservoirs such as surface seismic applications on land, marine or in a transition zone. The methods and systems described herein facilitate data compression for any measurements collected and/or transmitted relating to subterranean formations.

As used throughout the specification and claims, the term "logging" means to record a measurement versus depth or time, or both, of one or more physical quantities in or around a well and includes, but is not limited to: acoustic logging, resistivity logging, vertical seismic profiles, check-shot surveys, logging while drilling (LWD), measurement while drilling (MWD), permanent monitoring, semi permanent monitoring, fracture monitoring (including hydrofrac monitoring), temperature monitoring and pressure monitoring. "Automatic" means capable of producing a desired result without human intervention. "Signal-to-compression-noise ratio" refers to the strength of an entire data measurement such as a waveform, including raw noise, versus a decompressed data measurement that may include distortions resulting from data compression. Signal-to-compression-noise ratio does not refer to the underlying noise in a raw data signal. The words "including" and "having," as used in the specification, including the claims, have the same meaning as the word "comprising." The word "acoustic" includes both frequencies of conventional sonic tools, as well as those used in seismic tools and applications. "Perceptually transparent" is a term often used by skilled artisans to describe a successful lossy data compression.

The methods and systems presented herein for variably compressing measurements include certain specific algorithms by way of example to teach the principles of the present invention. Moreover, for clarity, the methods and systems are described below primarily with reference to sonic waveform data. However, the principles described may be applied to other data types, including, but not limited to, the data types associated with the measurements listed above (resistivity, nuclear, etc.). In addition, the algorithms disclosed to accomplish the methods claimed may be replaced by others that will be known to those of skill in the art having the benefit of this disclosure. One algorithm presented below is based on linear predictive (LP) coding, followed by one-pass Huffman coding of the residuals. However, because signal statistics vary considerably, measurements such as sonic waveforms may be divided into blocks of data and the prediction is adapted to the statistics of each block. The block size selection is a trade-off between an increase in side information necessitated by small block sizes and a loss of fidelity due to large block sizes. According to LP coding, the data compression is completely reversible and lossless. If a higher logging speed is required or a combination with bandwidth-consuming tools is needed, the same lossless algorithm is combined with an adaptive quantization technique to achieve higher compression rates. This quantization is non-reversible or "lossy" and some differences between the original and compressed data, called distortion or compression noise, occur. The distortion caused by quantization is evaluated below using objective metrics, such as signal-to-compression-noise ratio, and subjective metrics that compare the effects on waveforms in the time and frequency domains. This analysis is important for assessing any effects on the output obtained from conventional sonic processing. Examples of actual data demonstrate the efficiency of the variable compression and its effects when the lossy compression option is also used.

This disclosure describes methods that may be used in designing and implementing a compression scheme for use with many applications, for example sonic waveforms recorded by a wireline logging tool. The disclosure includes an explanation of the method steps of preferred embodiments of the invention, they theory behind the new variable compression methods and systems, including how the prediction may be done prior to the encoding. Practical steps that may be taken for implementing the methods in downhole software are also described below. Examples of some typical compression rates are also provided.

It is desirable to compress data in a lossless manner if possible such that decoded measurements are identical to original measurements. Referring initially to FIG. 1, according to one embodiment described below, measurements related to a subterranean formation 100, such as acoustic waveforms, are recorded by a measurement system such as a wireline sonic tool 102, and transmitted to an uphole computer or surface acquisition system 104. A communication channel may comprise a wireline cable 106 that connects wireline tools with the surface acquisition system 104. An encoder, for example a 16-bit ADC, converts each waveform or other measurement into signed integer samples with a sampling rate of 10 μs or 40 μs depending on the firing. In the decoder, the 16-bit samples transmitted through the cable may be used to generate waveforms that are similar to the originally recorded ones.

Figure 2:
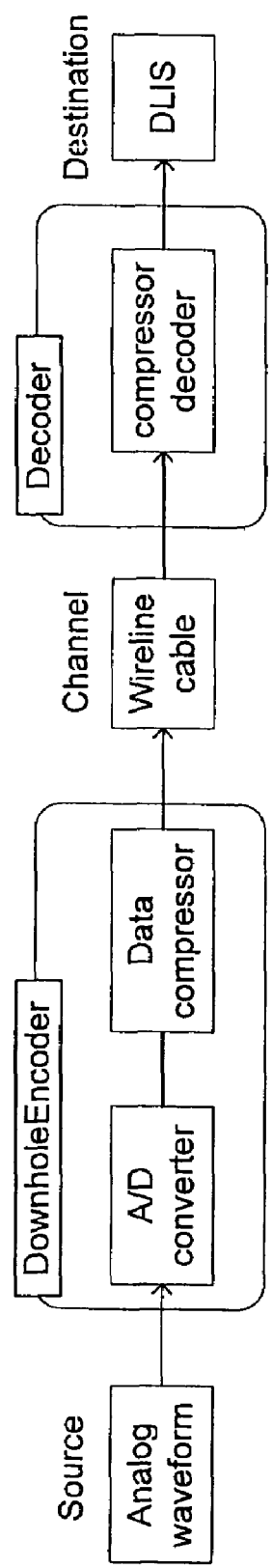
FIG. 2 is a block diagram illustrating a coding and decoding scheme for data compression of subterranean measurements according to one embodiment of the present invention.

In order to maintain a reasonable logging speed, the required data transmission rate for subterranean measurement with this simple analog-to-digital conversion is too large for a wireline cable. Therefore, it is necessary to consider a data compression scheme prior to transmission. One compression method described below achieves a significant reduction in data size by successful application of modeling and coding techniques. By incorporating compression methods with the A/D converter, a more efficient communication system as represented in FIG. 2 is obtained. In order for a measurement tool to reduce the size of the data to be transmitted by the cable, encoding is implemented in the downhole software. Decoding functions are installed in the uphole software and its purpose is to convert a binary sequence back into an original waveform or other measurement.

According to some aspects of the invention, measurements data is compressed based on linear predictive coding (LPC or LP coding). With linear prediction, waveform modeling is achieved by building an autoregressive model (AR) of the waveform, i.e., a model that is based on the previous samples. In order to clarify waveform modeling, some key elements defined below:

A waveform y is a sequence of amplitudes $\{y_t\}_{t=1,\ldots,N}$, where N is the length of the waveform.

A predicted waveform $\hat{y}$ is the sequence $\{\hat{y}_t\}_{t=1,\ldots,N}$ where each $\hat{y}_t$ is a linear combination of p past samples.

$$\hat{y}_t = \sum_{i=1}^{p} a_i y_{t-i} \text{ for } t = 1, \ldots, N \qquad (1)$$

p is called prediction order, and the coefficients $\{a_i\}$ are called LP coefficients.

e is defined as the sequence of the residuals $\{e_t\}_{t=1,\ldots,N}$ where $$e_t = y_t - \hat{y}_t \text{ for } t=1,\ldots,N \qquad (2)$$

Combining equations (1) and (2) yields:

$$y_t = e_t + \sum_{i=1}^{p} a_i y_{t-i} \text{ for } t = 1, \ldots, N \qquad (3)$$

Figure 3:
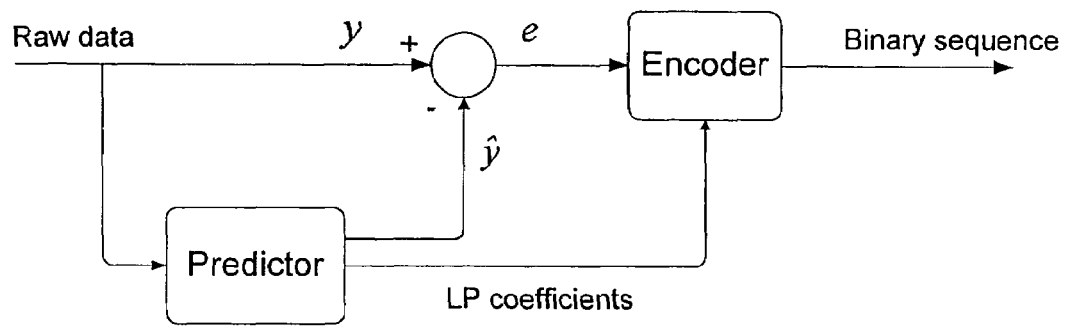
FIG. 3 illustrates Linear Predictive Coding prior to encoding according to one embodiment of the present invention.

Which implies that raw signals can be uniquely defined using only residuals and the LP coefficients. FIG. 3 represents the LPC compression method, which may be done prior to encoding to yield better compression results. The expected gains are in the reduction of the variance and the dynamic range of the difference sequence. How much the variance is reduced depends on how well the predictor can estimate the next value based on the previous values.

One of the difficulties associated with linear prediction is finding the LP coefficients that minimize residual variance. According to some methods of the present invention, this problem is presented below:

$$\sigma_d^2 = E[e_t^2] = E\left[\left(y_t - \sum_{i=1}^{P} a_i y_{t-i}\right)^2\right] \qquad (4)$$

where E[ ] is the expectation operator.

The solution for equation (4) can be obtained by solving the following set of equations:

$$\frac{\partial \sigma_d^2}{\partial ak} = 0, \text{ for } k = 1, \ldots P \qquad (5)$$

Taking the derivative, $$\frac{\partial \sigma_d^2}{\partial a_k} = -2E\left[\left(y_t - \sum_{i=1}^{P} a_i y_t\right) y_{t-k}\right] = 0 \text{ for } k = 1, \ldots P \qquad (6)$$

and rewriting the expectations, yields:

$$\sum_{i=1}^{P} a_i R(i-k) = R(k) \text{ for } k = 1, \ldots P \qquad (7)$$

where R(k) is the autocorrelation function defined by:

$$R(k) = E[y_t y_{t+k}] \text{ for } k=1, \ldots P \qquad (8)$$

For a given order, one way to solve the set of equations in (7) and (8) is to apply Durbin's algorithm, which computes the LP coefficients from the autocorrelation coefficients in an incremental manner. However, other algorithms may also be used.

According to some embodiments, measurement signals such as sonic waveforms may be divided into blocks or segments prior to applying LPC. Dividing measurement signals into smaller blocks may be important because most measurement signals considered are non-stationary. Hence, it is important to adapt the predictor to match the local statistics by using blocking and adaptive prediction. The selection of the block size is a trade-off between an increase in side information necessitated by small block sizes and a loss of fidelity due to large block sizes. The skilled artisan having the benefit of this disclosure may choose an appropriate block size according to conditions, preferences, or other parameters. Although any data segmentation methods may be used, two preferable methods are discussed below. The first data segmentation technique discussed below is a static or fixed-window size, and the second is a dynamic segmentation technique.

The more simple of the two data segmentation methods mentioned above is to choose a window of fixed length and apply the windows to an entire measurement signal. It will of course be appreciated, however, that a final window or block may be of different size than the fixed length. A fixed-length segmenting method presents the benefit of minimal side information related to the way the signal is segmented. The fixed length window blocking method may also be applied very quickly.

However, the static method described above may fail to yield acceptable results when multiple component signals are present in a single block. Therefore, it may be preferable to isolate each component of the signal. Isolating each component generally results in better prediction, i.e. the residuals are smaller and thus easier to encode.

Figure 4:
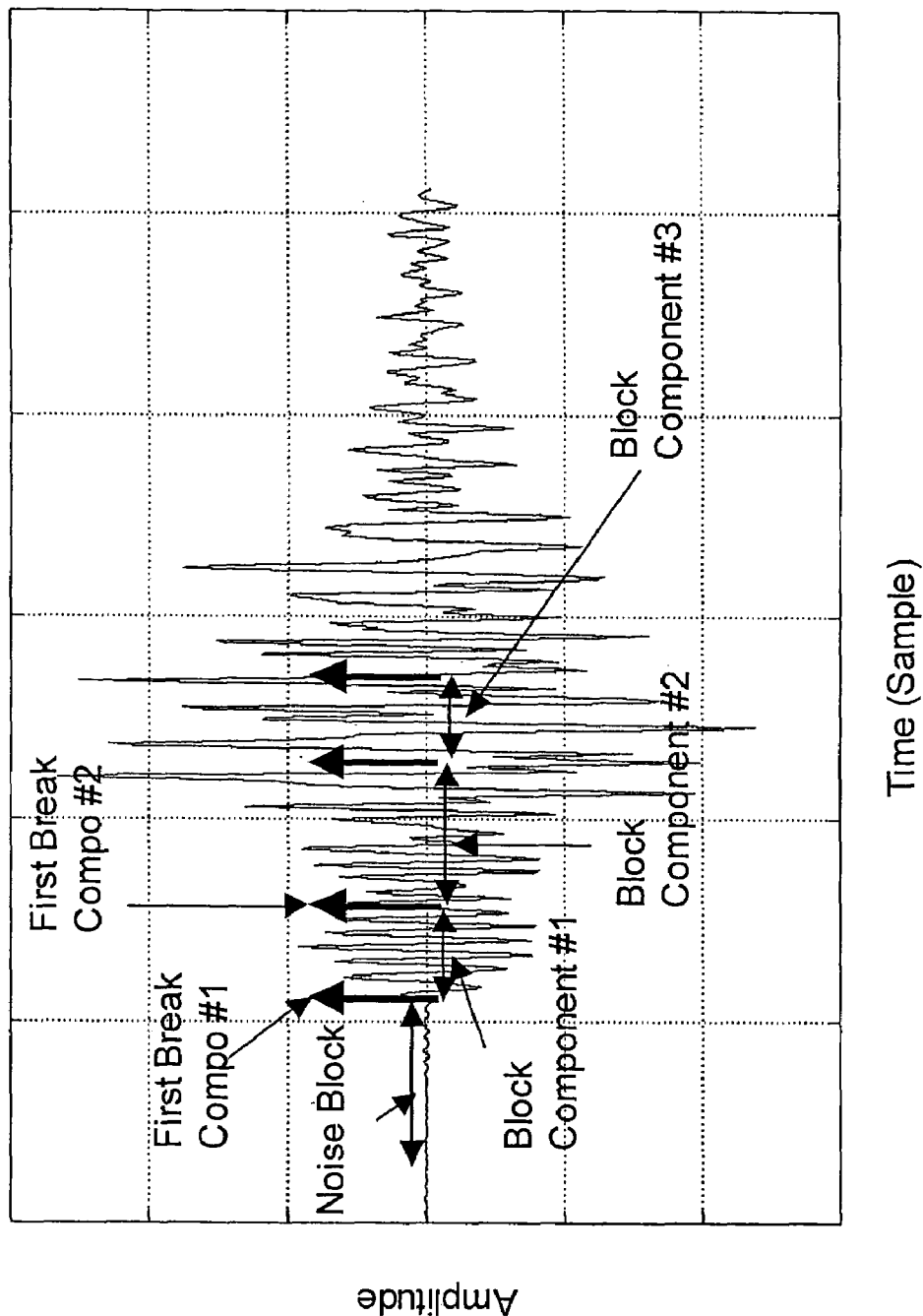
FIG. 4 illustrates an automatic signal segmentation method based on segregating different component signals according to one embodiment of the present invention.

According to some aspects of the invention, segmenting the signal according to the different components present in the data is accomplished by detecting the first break of the different components of a waveform. By detecting first breaks of each different component, an optimal window size is dynamically defined for each of the different components present in the measurement data. First breaks for each different component may be detected in any number of ways. For example, first breaks may be detected according to the methods and systems described in U.S. application Ser. No. 10/819,362 filed Apr. 6, 2004, which is hereby incorporated by this reference in its entirety. After defining the window size, the LP coefficients and the residuals are calculated as described above. FIG. 4 illustrates the segregation of different components contained in a seismic waveform.

Another data compression approach according to principles of the present invention may include identifying the first breaks of the different components of the measurement signal and compressing each separately. Considering one point of a signal, T, the time series before and after this point is modeled as an autoregressive model of order p. The signal can be decomposed into two sub-series, where each one is expressed as an autoregressive model:

$$\begin{cases} x_t = \sum_{k=1}^{p(1)} a_k^1 x_{t-k} + \varepsilon_{1,t}, (1 \le t \le T) \\ x_t = \sum_{k=1}^{p(2)} a_k^2 x_{t-k} + \varepsilon_{2,t}, (T \le t \le N) \end{cases} \quad (9)$$

The residuals, $\epsilon_{r,t}$, where $r \in [1,2]$, are assumed to have a double-sided exponential distribution, also called Laplacian pdf. A Laplacian distribution is defined as:

$$p(x) = \frac{1}{\sqrt{2}\,\sigma} e^{\frac{-\sqrt{2}}{\sigma}|x|} \quad (10)$$

where |x| is the absolute value of x. Also, $E(x)=0$ and $E(x^2)=\sigma^2$. Further, it is assumed that the residuals are uncorrelated with the deterministic part of the original signal, i.e. $E\{\epsilon_{r,t} x_{1-k}^r\}=0$.

The two AR models presented above (Equation (9)), a background noise model, and a signal model constitute a locally stationary AR model for the estimation of the first break arrival. Assuming that the non deterministic parts are Gaussian, the approximate likelihood function LF for the two non deterministic time series in the interval [1,T] and [T+1, N] is expressed as:

$$LF = \left(\frac{1}{\sqrt{2}\,\sigma_1}\right)^{\frac{T-1-p(1)}{2}} \exp\left(-\frac{\sqrt{2}}{\sigma_1} \sum_{t=p(1)+1}^{T-1} |\varepsilon_{1,t}|\right) \times \quad (11)$$

$$\left(\frac{1}{\sqrt{2}\,\sigma_2}\right)^{\frac{N-T+1}{2}} \exp\left(-\frac{\sqrt{2}}{\sigma_2} \sum_{t=T}^{N} |\varepsilon_{2,t}|\right)$$

With the log likelihood given by:

$$\log(LF) = -\frac{T-1-p(1)}{2}\log(\sqrt{2}\,\sigma_1) - \quad (12)$$

$$\frac{\sqrt{2}}{\sigma_1} \sum_{t=p(1)+1}^{T-1} |\varepsilon_{1,t}| - \frac{N-T+1}{2}\log(\sqrt{2}\,\sigma_2) - \frac{\sqrt{2}}{\sigma_2} \sum_{t=T}^{N} |\varepsilon_{2,t}|$$

The solution of the maximum likelihood estimation of the model parameters is obtained by differentiation of the log likelihood with respect to the LP coefficients. The solution is:

$$\begin{cases} \sigma_{1,\max} = \frac{1}{\sigma_1} \sum_{t=p(1)+1}^{T-1} |\varepsilon_{1,t}| \\ \sigma_{2,\max} = \frac{1}{\sigma_2} \sum_{t=T}^{N} |\varepsilon_{1,t}| \end{cases} \quad (13)$$

By substituting equation (13) into equation (12), the maximum logarithmic likelihood function is reduced to:

$$\log(LF) = -\frac{(N-T+1)}{2}\log(\sigma_2) - \quad (14)$$

$$\left(\frac{\log(\sqrt{2})}{2} + \sqrt{2}\right)(N - p(1)) - \frac{1}{2}(T - p(1) - 1) \times \log(\sigma_1)$$

The model order is computed using the Bayesian information Criterion (BIC) defined as:

$$BIC(p)=2^* \log \text{[maximizedlikelihood]}-2\beta\log N$$

where β represents the number of unspecified parameters of the model. In the case of two components, it is obtained as $$\beta=p(1)+p(2)+4 \quad (15)$$

The point T where the joint likelihood function is maximized, or where BIC is minimized, determines the optimal separation of the two stationary time series, i.e., the first break. Therefore, it is possible to express the log likelihood function as a function of the point of separation between the two time series. BIC criterion leads to the computation of:

$$\min[BIC(T)]=2\times\min(\log(LF))-2(p(1)+p(2)+4)\log N \quad (16)$$

$$\min[BIC(T)]=-\min[(T-1-p(1))\times\log\sigma_1+(N-T+1)\times\log\sigma_2+g(N)] \quad (17)$$

After the data is windowed, the optimal model order is computed using the BIC criterion. Knowing the model order, it is a simple matter to compute the LP coefficients for each block and encode the residuals. According to this method, the encoding of the residuals is done block by block. The different steps described above are done for each individual block. This method provides the first break of the different components present in a signal, along with the model order and related LP coefficients for each. This information is directly used by the encoder, as explained below.

Using the method described above, not only is a good compression rate achieved, but also the first break and the different components of the data are found. One application for the method described above is in Logging While Drilling (LWD), where the waveforms are recorded in a downhole memory, but the first break information can be sent uphole using only few bits. The first break information can be also used to calculate the velocity of the P and S waves excited by a monopole and dipole source S (FIG. 1) respectively. In wireline and seismic operations, the first break information can be used to give an early estimation of the characteristics of the logged interval, and could be employed to automatically "zone" the well, and generate smart parameters for it.

Another compression method that may be employed according to aspects of the present invention is a Differential Pulse Code Modulation (DPCM) system. Using DPCM, instead of coding the amplitudes, the difference between consecutive values is coded. This concept may be extended to the p-th order, where the residual code is the error signal from the p-th order difference. In other words, the residuals are calculated as follows:

$$e_t^0 = y_t \tag{18}$$

$$e_t^{p+1} = e_t^p - e_{t-1}^p \text{ for } p=0, \ldots P \text{ and } t=1, \ldots N \tag{19}$$

Figure 5:
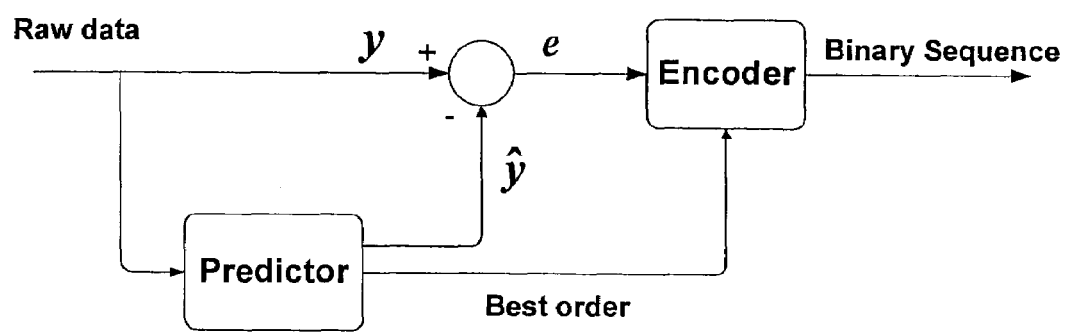
FIG. 5 illustrates Differential Coding prior to encoding according to one embodiment of the present invention.

Each residual term is formed from the difference of the previous order predictors. As each term involves only a few integer additions/subtractions, it is possible to compute the residuals for different orders, and estimate their variance. Hence, the order which gives the smallest variance can be found. The process is summarized in FIG. 5. The predictor for differential coding is easily constructed at both the sending and receiving devices. With differential coding, there is no need to send the LP coefficients because the order is sufficient for uniquely defining the prediction polynomial.

In order to retrieve the raw signal from the residuals, the predicted signal must be calculated at the decoder. This is done for the appropriate order by using the following equation:

$$\hat{y}_t^{p+1} = y_t^{p+1} - e_t^{p+1} \text{ for } p=0, \ldots P \text{ and } t=1, \ldots N \tag{20}$$

These polynomials can be calculated simply in both the transmitter and receiver. But, for practical reasons, and in order to simplify the calculations as much as possible, it is assumed that they are calculated a priori or are hard-coded in. In conclusion, the transmitter calculates the residuals for all the possible orders, compares their variance in order to find the best order, and sends it as side information as side information. And because there is a one-to-one mapping between orders and prediction polynomials, the signal can be generated without loss from the residuals. This near-zero overhead allows this method to give good results, especially for short waveforms.

According to some aspects of the present invention, multiple methods of compression are applied to measurements data in parallel. Therefore, the benefits and advantages of the general linear prediction and differential coding methods (and/or others) may be realized by combining them in an efficient manner. For both methods described above, low-order prediction may be used in order to reduce complexity so that the methods can be implemented within hardware constraints. The coefficients are typically floats, and sending them without modification could cause large overheads, especially in seismic measurement where the size of the waveform (or, waveform portion) to be encoded is small. Therefore, a quantization scheme may be utilized such that each coefficient is uniquely associated with a small integer. According to one coding method, coefficients are multiplied by a factor then rounded to the nearest integer. In addition, rather than using 32 bits to represent each coefficient, only 7 to 10 bits may be used.

If multiple compression methods such as the two described above are combined, according to some embodiments only the measurement with the highest compression rate is reported and encoded. For example, the results obtained from linear prediction may be compared with those obtained by differential coding. Tests on different waveforms have shown that differential coding compression rates are sometimes higher than compression rates associated with LPC compression. Also, tests have shown that the performance of differential coding does not improve significantly with higher orders, therefore, according to some aspects the maximum order may be limited, for example, to p=6. However, higher orders may be used if desired.

Figure 6:
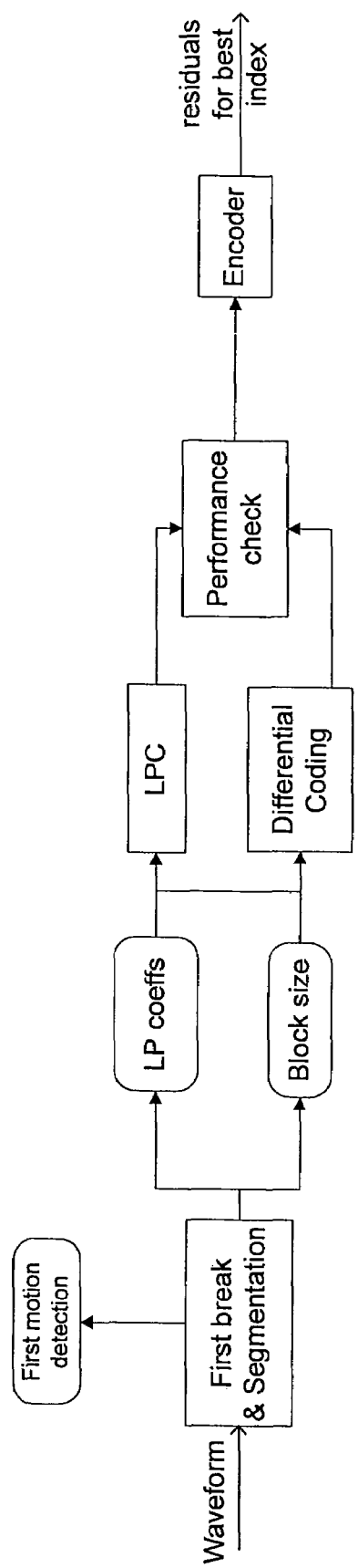
FIG. 6 is a block diagram of a multiple data compression scheme run in parallel according to one embodiment of the present invention.

Generally, the differential coding method yields good results when the waveforms are relatively clean. On the other hand, linear prediction generally yields superior results for noisy data. By combining both approaches described above or others, most measurements can be effectively compressed. An illustration of a method of combining multiple compression methods is presented in FIG. 6.

The use of linear prediction provides a substantial decrease in the variance of the signal to be encoded. It also affects the distribution of the codes, and gives smaller entropy because of the steeper concentration around 0. The samples in the prediction residuals are assumed to be uncorrelated and therefore may be coded independently. The challenge of residual coding is to find an appropriate form for the probability density function (pdf) of the distribution of residual values so that they can be efficiently modeled.

According to some subterranean measurement systems, a variation of Elias codes referred to as Golomb-Rice codes are used. The Golomb-Rice codes are preferred to other codes because they can be encoded and decoded with a few logical operations. According to Golomb-Rice codes, each integer is divided into a sign bit and a positive amplitude value. Then, low order bits are written in binary form, and high order bits are written in unary form. The Golomb codes include a parameter g that decides the length of this boundary. Rice codes are a special case where $g=2^m$, where m is called the mantissa of the code. The primary advantage of Rice-Golomb codes is their simple one pass implementation that does not rely on the construction of a large search tree, such as that needed in a standard Huffman coding. This has significant implications on the complexity of the whole process, and on the computational and storage overheads associated with transmitting a more general code.

Using Golomb-Rice coding, the representation of any number n is the concatenation of (n div $2^m$) as a unary code and (n mod $2^m$) is binary. Thus, every integer n is represented by exactly $\ln/2^m\rfloor+m+1$ bits, where $\lceil x \rceil$ represents ceiling value of x. The mantissa value is a very important parameter that affects the efficiency of the Golomb-Rice codes. The length of the compressed sequence will be greatly affected if the wrong mantissa is chosen. In order to have an optimal representation, it is necessary to find the mantissa m, such that half the samples lie in the range $\pm 2^m$.

This will ensure that the Golomb-Rice code is m+1 bits long with 0.5 probability and m+k+1 long with $2^{-(m+k)}$ probability. Solving this problem for m gives:

$$m = \log_2\left(\log(2) * \frac{\sigma}{\sqrt{2}}\right) \quad (21)$$

Equation (21) implies that in order to calculate the best mantissa, m, the variance of the signal needs to be calculated, a step that can be relatively expensive in terms of computation time. By observing that:

$$E(|x|) = \int_{-\infty}^{+\infty} |x| p(x) dx = \frac{\sigma}{\sqrt{2}} \quad (22)$$

m can be directly estimated from the mean expectation $$m = \log_2(\log(2) * E(|x|)) \quad (23)$$

Because the sum of absolute values is linearly related to the variance, m may be used as the basis for the selection predictor and the whole process is relatively inexpensive to compute because it involves no multiplications.

Figure 7:
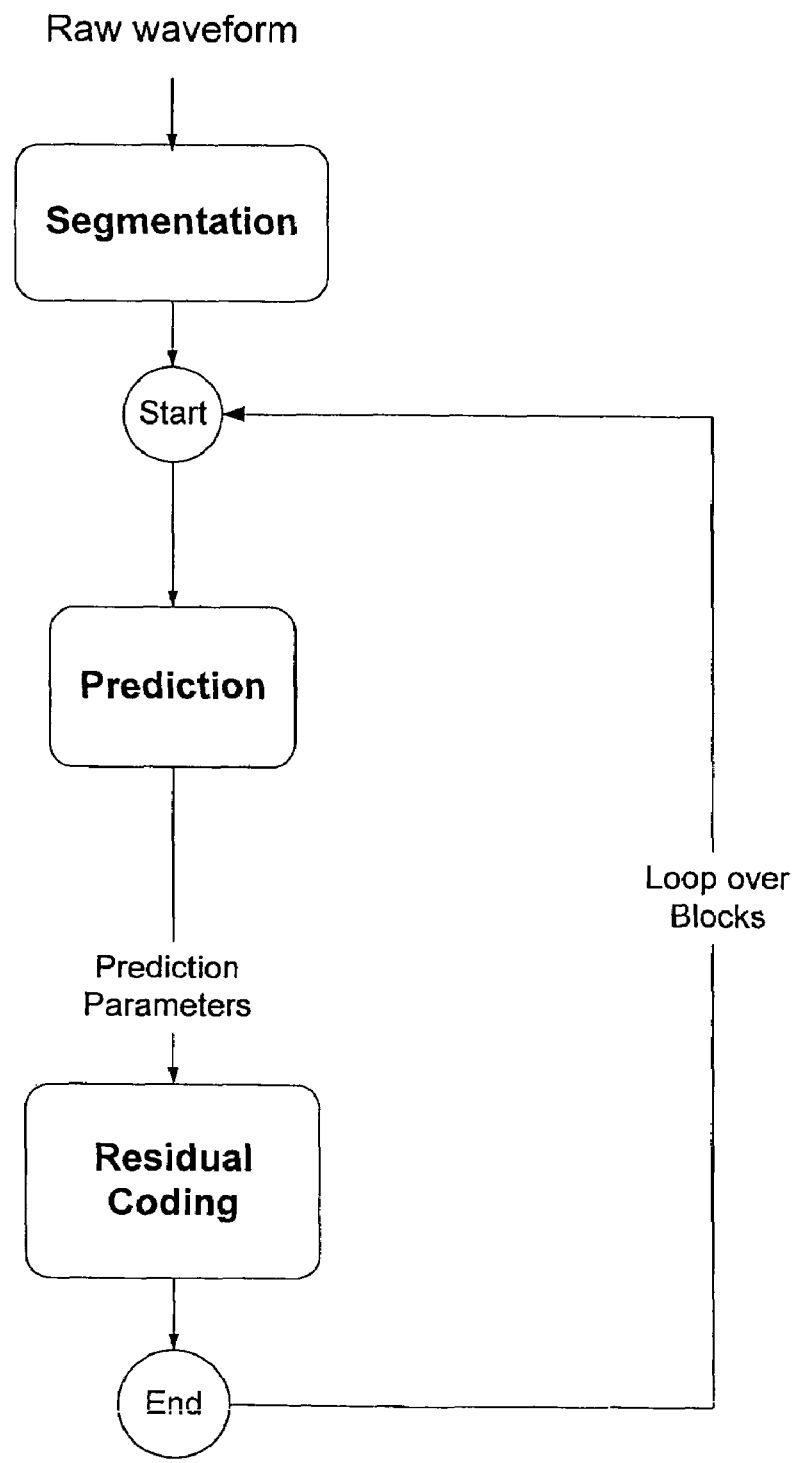
FIG. 7 is a flowchart illustrating a lossless data compression method that may be used according to one embodiment of the present invention.

The complete prediction/coding process for lossless compression including both the prediction process and the coding process explained above, is summarized in FIG. 7.

Rice-Golomb codes, like many similar coding methods, are optimized for positive integer values. However, because the residuals can be also negative, a sign bit needs to be appended at the end of each code. Hence, the total size associated with these sign bits is exactly 1 bit/sample. As described below, some aspects of the present invention may include a simple technique for increasing the compression rate by reducing the size of sign bits by 25 to 40%. The compression technique is based on a combination of Run Length Encoding (RLE) and Huffman coding. Nevertheless, this additional compression method is optional, because the gain in size is related to the length of the waveforms, and it is a trade-off between the gains and the computing time.

The sign bit compression method comprises the following steps:

(1) First, a "magnitude+sign" depiction is used to represent residuals. The magnitudes are compressed using the Rice-Golomb algorithm explained above. The sign bits are grouped into one single stream of bits, and they are coded as shown in the following steps.

(2) The number of repeated bits is written as an integer. Run Length Encoding is used to send the resulting sequence. For example, if the sign bit sequence is 1110011110000, . . . the result is (1,3),(0,2),(1,4),(0,4) . . .

(3) If the first sign bit (1 in the example above) is sent at the beginning, then it is not necessary to send the encoded bit (0 or 1) each time. So, the sequence above can become 1,3,2,4,4, . . .

(4) Each number has at least one appearance. Therefore the number to send can be decreased by 1. In the case of the example above, it is only necessary to transmit the following sequence 1,2,1,3,3, . . .

(5) Huffman coding is applied to the resulting numbers and the Huffman codebook is sent as side information. The results are good because small numbers usually repeat while large numbers are rare.

Figure 8:
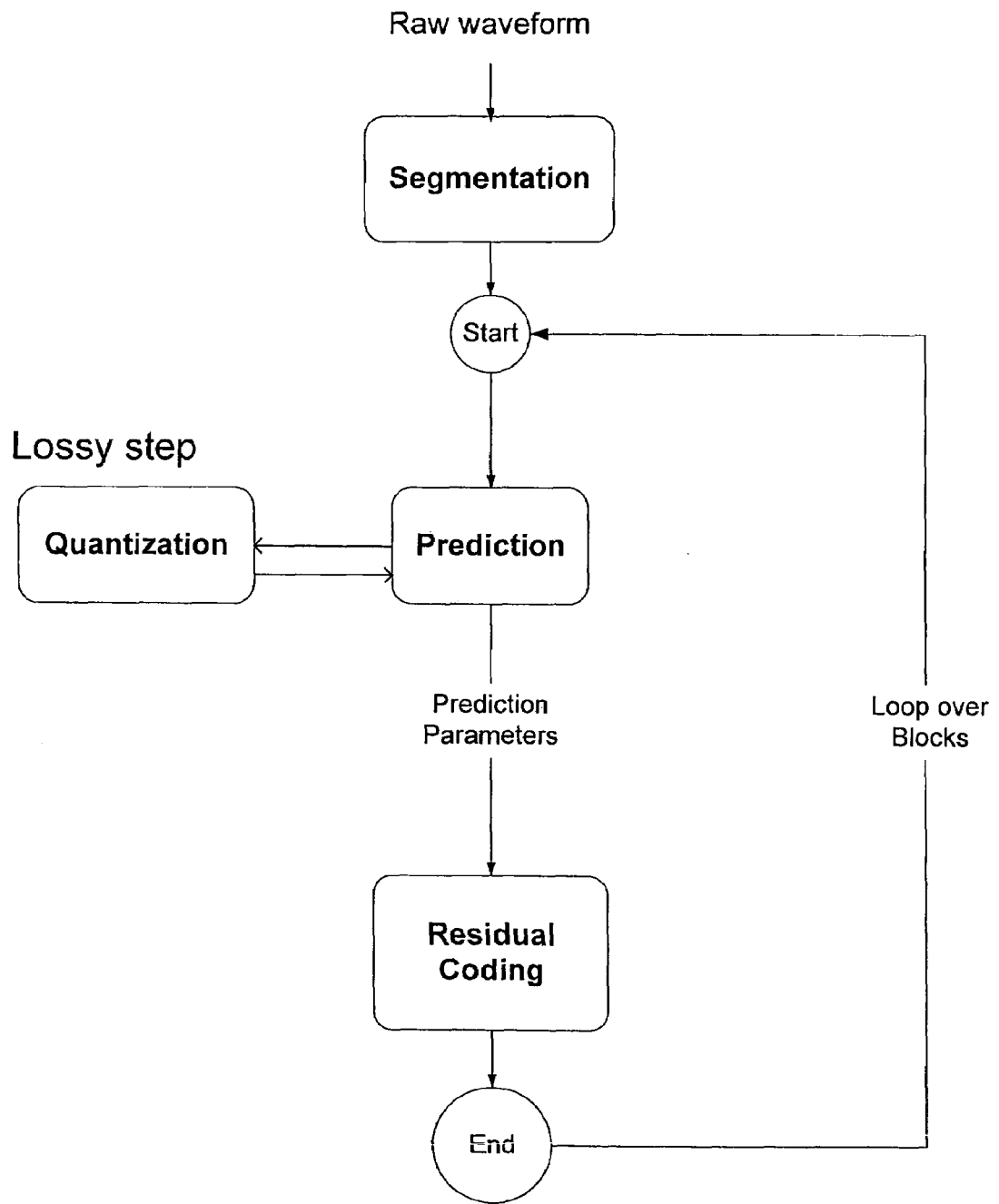
FIG. 8 is a flow chart illustrating a lossy data compression method that may be used according to one embodiment of the present invention.

Quite often in subterranean measurement operations, compressed waveforms obtained with lossless methods (e.g. the LPC and differential coding methods described above) are not sufficiently small. A loss in accuracy is sometimes an acceptable tradeoff in return for better compression. However, lossy algorithms are non-reversible and some difference between the original and compressed/decompressed data occurs. This difference is called distortion or compression noise and may be quantified as a signal-to-compression-noise ratio. The paragraphs below present a method of lossy compression of subterranean measurements, such as acoustic waveforms, based on a fixed-rate compression. Lossy compression methods may be combined with one or more of the lossless compression methods described above according to some aspects of the present invention, wherein the compression mode is automatically selected. The lossy method described below is an extension of the lossless method presented in the previous section, with the addition of a scalar quantizer before encoding. That is to say, the main compression engine is still lossless, and quantization is applied as a pre-process. As described below, the differences between original and compressed waveforms which are caused by this process do not affect the overall quality of the data. FIG. 8 illustrates one example of where this quantization process may fit into the complete process.

Quantization is one of the simplest forms of lossy compression. It is the process of representing a large—possibly infinite—set of values with a much smaller set. If this quantization process is performed separately on each sample from a signal sequence, it is called scalar quantization. A familiar quantizer is the analog-to-digital (A/D) converter, where the input is analog. The rate of the quantizer is the average number of bits required to represent a single quantizer output. The difference between the quantizer input and quantizer output is called quantization error or quantization noise. The mean squared quantization error (MSQE), denoted as $\sigma_q^2$, is the average squared difference between the quantizer input and output.

If there is no prior information about the distribution of the quantizer input, a uniform distribution is assumed. Error is also uniformly distributed over the interval $$\left[-\frac{\Delta}{2}, \frac{\Delta}{2}\right].$$

The MSQE is expressed as:

$$\sigma_q^2 = \frac{\Delta^2}{12} \quad (24)$$

For simplicity of implementation, the quantization interval is taken as a power of 2. If $\Delta=2^n$ can be written where n=0, 1, . . . equation (24) can be rewritten as:

$$\sigma_q^2 = \frac{2^{2n}}{12} \text{ for } n = 0, 1, \ldots \quad (25)$$

For most acoustic signals, low amplitude signals are more sensitive to noise than high amplitude signals. Low amplitude signals also occur the most frequently and are easiest to compress effectively. Therefore, according to some aspects of the invention, distortion of the low-amplitude signals is reduced or minimized. Low-amplitude measurements may be reduced or minimized with non-uniform quantizers such as logarithmic quantizers or companders (compressor/expander).

According to the methods of minimizing low-amplitude measurement distortion discussed below, coding is controlled to ensure that a certain signal-to-compression-noise ratio is not exceeded. The problem is presented as follows: finding the optimal quantization step, $\Delta=2^k$, which achieves the highest possible compression rate, while satisfying:

$$SNR_k \geq K, \qquad (26)$$

where K is a positive integer (typically in dB), and $SNR_n$ is the signal-to-compression-noise ratio caused by re-quantization to $\Delta=2^k$. Using equation (25), equation (26) is rewritten as:

$$10 \log_{10}\left(\frac{\sigma^2}{2^{2k}/12}\right) > K \qquad (27)$$

The optimal solution, k, that solves equation (27) is:

$$k = \left\lfloor \frac{1}{2}\log_2\left(\frac{12\sigma^2}{10^{\frac{K}{10}}}\right)\right\rfloor, \qquad (28)$$

where $\lfloor\ \rfloor$ represents the floor value of a real number.

Equation (28) shows the relationship between the quantization step, $\Delta=2^k$, and the signal variance. Because the signal is divided into different blocks, the low-amplitude blocks (which have a smaller variance) will also have a relatively small quantization step. Therefore, a signal with low amplitude, such as a headwave, is not significantly affected by the quantization process. In many instances, especially for high values of K, the value of k obtained can be larger than the value of the original signal. In such cases, no quantization occurs and the whole process is totally lossless. Otherwise, quantization is conducted using a uniform quantizer whose step is sent to a receiver as side information. After the re-quantization process, the prediction and encoding processes are conducted in the same or substantially the same way as for lossless compression described above. Accordingly, the lossy method described above advantageously shares most of the code used for lossless compression.

The design of a quantizer for a measurement such as a specific acoustic signal depends on source output and sensitivity to noise. Accordingly, an example of lossy compression of a monopole waveform containing both compressional and shear arrivals is presented below. As an exemplary threshold used for purposes of discussion, K=40 dB is selected. However, any predetermined threshold may be used (e.g. 30 dB, 40 dB, 50 dB 60 dB, etc.). In order to compare raw compressed waveforms, both are plotted in FIG. 9. Also, the difference between the two curves (compression-noise) is plotted below the waveforms. The frequency content of this noise compared to the frequency spectrum of the measurement signal is presented in FIG. 10.

Figure 9:
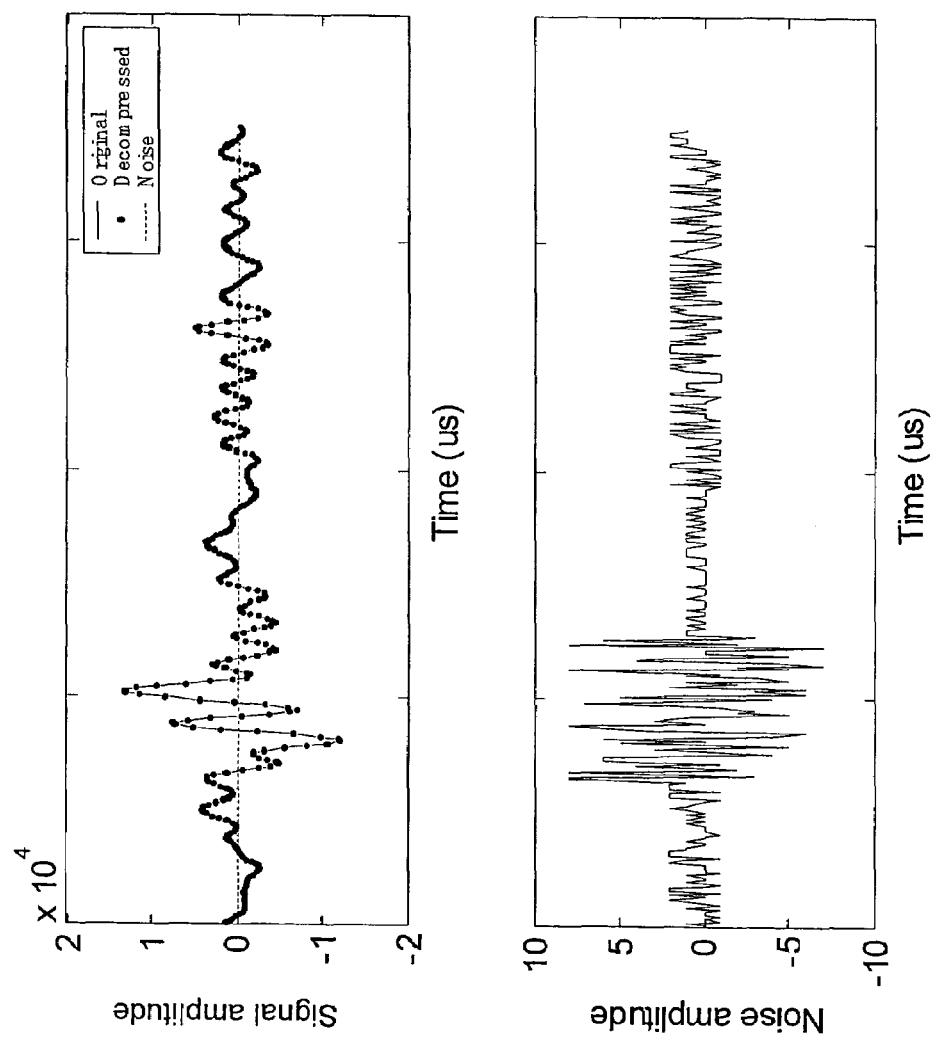
FIG. 9 illustrates a raw monopole waveform, noise, and a decompressed version of the monopole waveform following compression of the raw monopole waveform according to one method of the present invention.
Figure 10:
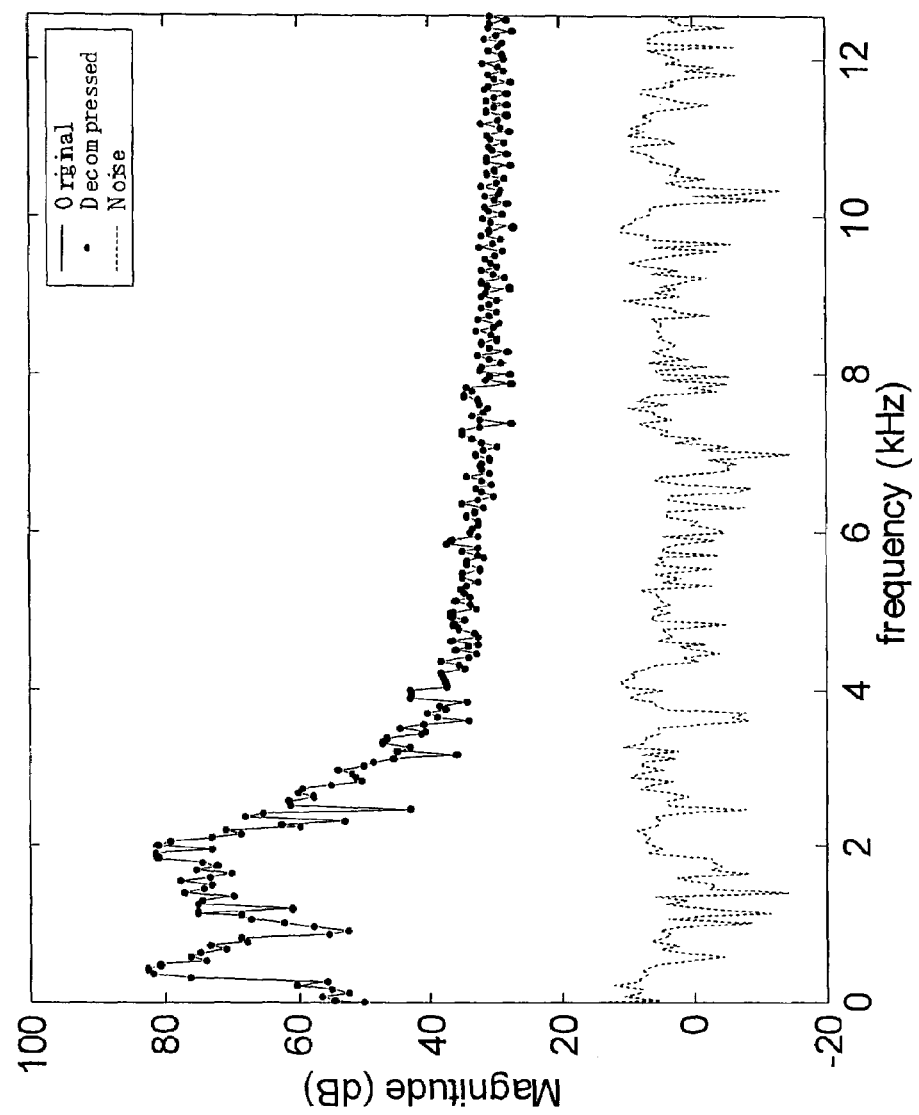
FIG. 10 illustrates a frequency spectrum of the raw signal, a decompressed signal, and noise shown in FIG. 9.

FIG. 9 indicates that in a time-domain, the differences (noise) caused by lossy compression according to the methods described above are quite small in comparison with the original signal. FIG. 9 also shows that the differences are exclusively concentrated in the sections of the waveform that have the largest amplitudes. FIG. 10 shows that distortions caused by compression do not affect measurement signal power and that any effects are concentrated at the higher frequencies where the signal strength is reduced. This observation has been verified by extensive tests, some of which are discussed below, and were performed on different waveforms analyzing compression noise characteristics using various signal processing techniques (STC, TKO . . . ).

Most measurement systems include software applications to facilitate operations. Therefore, implementation of the principles discussed above to downhole software is discussed below. As mentioned above, for many measurement systems such as well logging systems, the principle limitation related to recording large amounts of data with a high logging speed is the ratio of the telemetry rate versus data size. The relationship between logging speed, telemetry rate and data size can be written as follows:

$$\text{Logging Speed}_{(ft/h)} = 3600 \times \frac{\text{Telemetry}_{(bps)}}{\text{Total Data}_{(bits/ft)} * (1-CR)}$$

where the compression rate is defined as:

$$CR = \left(1 - \frac{\text{Compressed Size}}{\text{Original Size}}\right) * 100\% \qquad (29)$$

As telemetry bandwidth is a relative constant for most subterranean measurement systems, the primary ways to increase the logging speed are to reduce the size of the recorded data and/or increase the compression rate. According to some aspects of the present invention, both approaches are combined in order to achieve the maximum logging speed while maintaining the highest data quality. To reduce data size, according to some aspects of the present invention, logging tools may include several configuration modes wherein data is not recorded from all receivers, and/or where modal decomposition is used in order to send only particular modes by combining data from all active azimuthal sensors. Also, in order to achieve size gains before transmitting data to a telemetry system, according to some aspects software code is implemented on a tool DSP (downhole digital signal processor). Compressed waveforms are sent uphole using an available telemetry system and decompression will be implemented using an uphole portion of the acquisition system (e.g. a truck or offshore unit).

According to some embodiments of the present invention, generic data management software comprising an algorithm supports both lossless and lossy implementation with one code. Moreover, several levels of compression modes are constructed and tailored for different firings. The code is programmed to switch between these modes automatically, simply by changing a few parameters that do not require user involvement. This adaptability is important for a tool that has several firing modes, each with its own characteristics and quality concerns.

According to some aspects of the present invention, if the compression rate—and logging speed—achieved by lossless compression is not sufficient to meet demands, lossy compression is considered. Below is a description of one of many methods that may be used and implemented on subterranean tool software to automatically switch between multiple levels of lossless and lossy data compression modes. First, several sets of parameters are created for implementation by the data management software. These sets of parameters include: Processing block size, Quantization step for original waveform, and Minimum acceptable compress ion-SNR.

The sets of parameters created are called compression levels. Level 0 represents lossless compression and higher levels represent parameters of progressively higher compression rates. However, as the compression rate increases, so does the distortion to the data.

Telemetry systems generally have a fixed bandwidth. Therefore, it is important to have an accurate estimate of the amount of the data that will be transmitted. Dynamically changing compression rates necessitate dynamic changes to the logging speed. Changing logging speed is very difficult or impossible to achieve automatically with current logging systems because of human involvement (winchman). It is generally preferred to maintain a substantially constant logging speed. Moreover, some communication systems are not well suited to implementing variable-rate coding (compression) techniques, including lossless algorithms, because of the risk associated with fluctuation of channel communication rate.

However, according to principles of the invention there are methods capable of benefiting from the adaptability of data management software applications such as the one proposed herein in order to achieve a stable logging speed and, at the same time, improve the quality of the measurements related to subterranean formations (e.g. compressed waveforms). The methods described below require very little computer resources and are suitable for downhole implementation. According to one aspect, upper and lower limits are assigned to a total logging speed, and a data compressor dynamically changes its parameters automatically to satisfy the upper and lower logging speed limits.

According to some embodiments, the methods of variable compression are based on the creation of at least two and preferably several levels of compression, with the lossless mode (renamed $0^{th}$ level) and the lossy mode (renamed $M^{th}$ level) as its predetermined lower and upper limits, respectively. The $M^{th}$ level is preferably validated before measurement operations using appropriate distortion metrics, such that an operator is satisfied that data quality at the $M^{th}$ level is within acceptable limits (i.e., the data has a signal-to-compression-noise ratio greater than or equal to a predetermined level (e.g. 25 dB, 30 dB, 40 dB, 50 dB or others)). Analysis of a validation process is discussed below.

Figure 11:
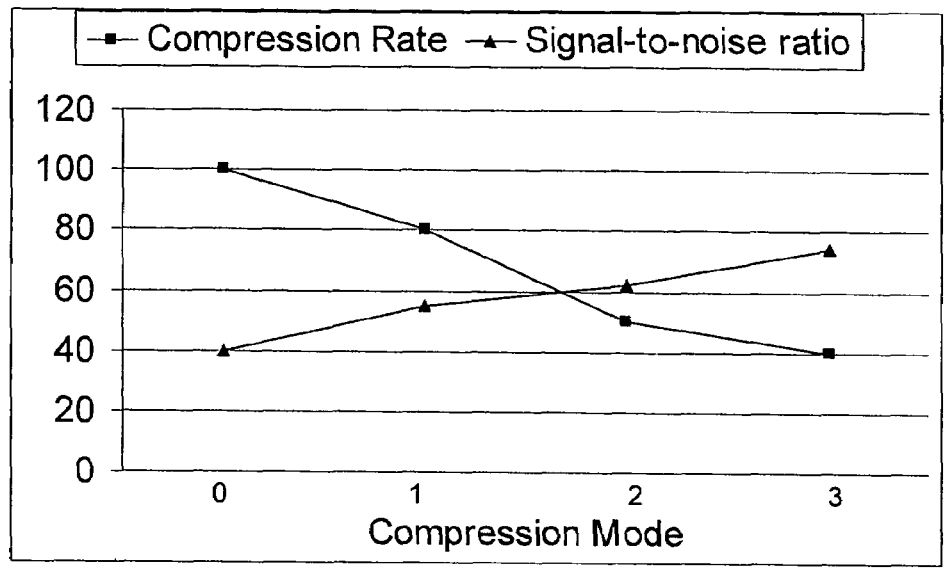
FIG. 11 is a chart illustrating the relationship between higher compression rates and signal-to-compression-noise ratio (or compression-noise).

According to one method, levels between the $0^{th}$ and $M^{th}$ levels are created, $1, 2, \ldots, M-1, M$, such that lower numbers indicate lower compression rates and less distortion ($0^{th}$ level is equivalent to a minimal compression rate and zero distortion). FIG. 11 illustrates the relationship between compression rate and distortion (or signal-to-compression-noise ratio). According to the example of FIG. 11, $M=3$. All levels $i$, where $i<M$, have less distortion than the $M^{th}$ level. The $M^{th}$ level is the most aggressive (has the highest compression rate and corresponds to the fastest measurement (e.g. logging) rate available), and has the smallest signal-to-compression-noise ratio. The lossless level ($i=0$) indicates no difference between raw and compressed data. When $i=0$, the signal-to-compression-noise ratio is approximately 100 dB, but not infinite due to the digitization/quantization of the measurement (such as a waveform) in 16-bit samples, as explained in section above.

According to some aspects, the compression scheme of a first set of measurement data begins using the $0^{th}$ or default level because it allows estimation of the maximum size of the compressed measurement. "Default" indicates an initial or immediately previous level. If the compression rate obtained is less than the lower limit ($i=0$) or higher than the upper limit ($i=M$), then the mode is increased or decreased, accordingly. This is done iteratively, for each measurement, by using the constraint that the compression level, $i$, is always bounded as follows: $0 \leq i \leq M$. The changes to compression rate mode may also be based on signal-to-compression-noise ratio such that a signal-to-compression-noise ratio associated with each compression rate is compared to a predetermined minimum signal-to-compression-noise ratio. The mode, $i$, may be changed from the previous or initial (i.e. default) rate to a lower rate if the signal-to-compression-noise ratio less than the predetermined minimum signal-to-compression-noise ratio. Similarly, the default rate may be increased if the signal-to-compression-noise ratio is greater than a sum of the minimum signal-to-compression-noise ratio and a predetermined additional factor (e.g. total of the minimum signal-to-compression-noise ratio and predetermined additional factor is 100 dB).

Figure 12:
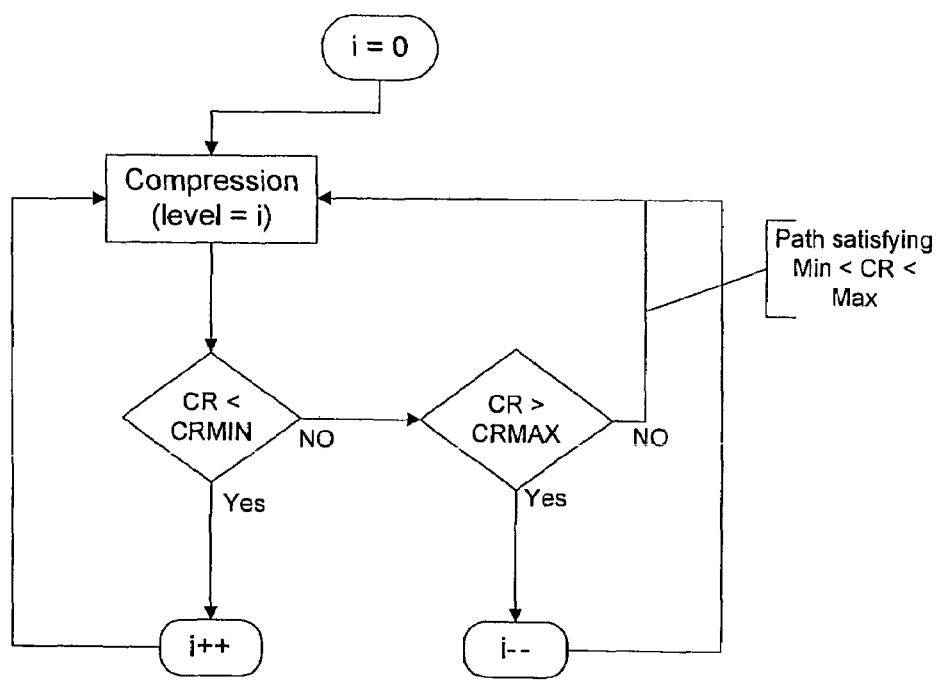
FIG. 12 is a flowchart illustrating a method of automatic compression rate adjustment to obtain a logging speed set within a predetermined range according one embodiment of the present invention.
Figure 13:
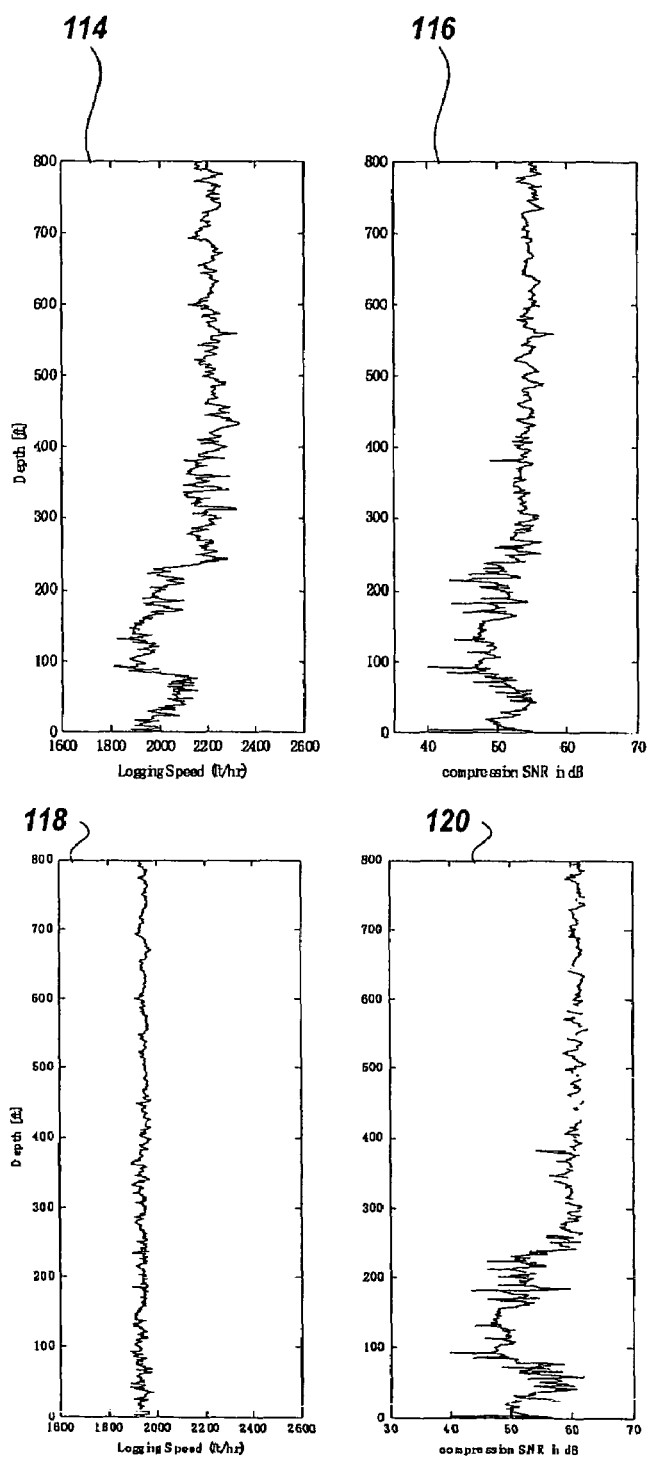
FIG. 13 illustrates an improvement to logging speed available by implementing the variable compression rate methods of the present invention.

Because there is no downhole time available for trial-and-error operation, this information will be applied starting from the next frame in an iterative manner. A simplified flowchart of the automatically adjusting compression method is illustrated in FIG. 12. The result of applying this simple scheme to dipole data from actual field data recorded by the Schlumberger's MSIP EXP tool using only three compression levels is shown in FIG. 13. According to the example shown in FIG. 13, two firings are used: 1) a monopole encoded using lossless mode; and 2) a dipole compressed using the lossy mode. An upper left column 114 indicates logging speed, which is linearly correlated with the compression rate. An upper right column 116 shows the signal-to-compression-noise ratio associated with the use of lossy compression (for dipole only). According to the upper columns, which represent a logging operation without use of the stabilization function of FIG. 12, logging speed must be considerably reduced in the 100–250 foot depth region in order to provide data having a signal-to-compression-noise ratio of at least 40 dB. However, in practice logging speed cannot be quickly changed and compression rate does not change at all. Therefore, according to conventional practice, the entire logging operation would have to be run at the slowest speed providing acceptable data for the entire well (approximately 1800 ft/hr in the upper left column 114).

Analyzing the lower curves in FIG. 13 shows that implementing the variable compression rate and stabilization function (FIG. 12) described above results in a generally constant the logging speed versus depth (lower left column 118). FIG. 13 also illustrates an improvement in signal-to-compression-noise ratio for all frames (lower right column 120), because the lossy mode used for FIG. 13 is considered the most aggressive, and it is outperformed—in terms of distortion—by all other modes. Actually, for many frames where the data is easily compressible, the lossless mode is used and no noise is added to the data (shown as discontinuities in the lower right column 120)).

The DSP in the some measurement tools such as the MSIP logging tool is fixed-point, which means that floating-point calculations without overflows can be very expensive. Computational errors are most likely to be generated when estimating the logarithms such as in equation (29). According to some aspects of the present invention, this problem may be reduced or eliminated by computing a table of all possible logarithm values at the beginning of the processing and using the table for all subsequent calculations. After successful implementation on the DSP software, subsequent tests revealed that there are no such errors on the DSP for both lossless and lossy compression.

Figure 14:
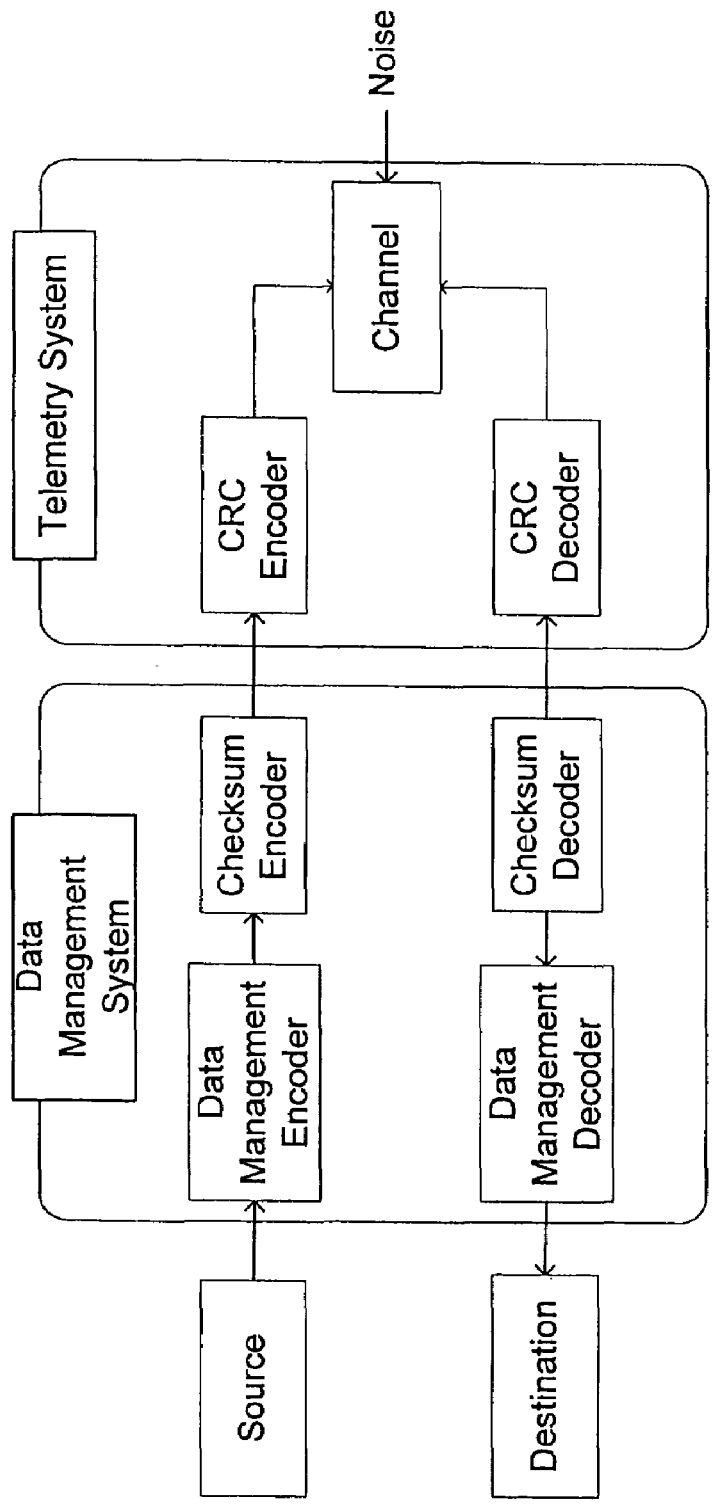
FIG. 14 is a block diagram illustrating an error detection scheme implemented by a telemetry system of a measurement tool according to one embodiment of the present invention.

Moreover, to further reduce errors and minimize overhead, a 16-bit checksum may be used according to some aspects of the invention along with Cyclic Redundancy Codes (CRC). According to this scheme, each compressed sequence is accompanied by a numerical value based on the sum of all bytes. The receiver then checks to make sure the accompanying numerical value is consistent with the received data. If the counts match, it is assumed that the complete transmission was received. If not, the message is seen as garbled and is discarded from future processing. Checksum is chosen for error-correction because of its small overhead and ease of implementation. A simple diagram of the system with this added capability is presented in FIG. 14. In order to evaluate the performance of the methods described above on actual field data, in-depth tests were conducted. Representative results are presented below. According to one test, 13 receiver stations with 4 azimuthal receivers R (FIG. 1) per station were used. Therefore, there were a total of 52 receivers for each firing. The tool used has one DSP per receiver station, which is why the waveforms recorded at each depth are concatenated into one single waveform. This waveform is compressed and the resulting sequence is sent to the master DSP, which sends it uphole.

For the acquisition, the three most standard firings were used simultaneously:

1. P and S mode: monopole firing with a frequency band of 5 to 15 kHz.
2. Dipole mode with a frequency band of 0.3 kHz to 3 kHz.
3. Stoneley mode: uses a monopole firing with a frequency band of 0.3 kHz to 3.5 kHz.

The compression rates when applying the methods described above on all the waveforms are presented in Table 1.

Llossless compression was applied to P and S waveforms, and lossy coding (level 2) to Dipole and Stoneley waveforms. Typically, the compression rate varies with depth according to the present invention

TABLE 1

Compression rate table. Lossless compression is used for near and far monopoles.

| | Compression mode | Min. CR | Max. CR | Average CR |
| --- | --- | --- | --- | --- |
| Near Monopole | Lossless | 45% | 54% | 49% |
| Far Monopole | Lossless | 54% | 58% | 56% |
| Dipole | Lossy | 80% | 85% | 83% |
| Stoneley | Lossy | 79% | 83% | 81% |

By using this compression scheme, the logging speed is typically improved by a factor of 3 to 4.

As presented in Table 1, applying principles of the present invention results in a significant decrease in the data size for both lossless and lossy compression modes. For example, the data size for dipole is reduced by more than 80%, attaining a compression ratio of 5. The high compression rates in lossy compression may trigger questions about the quality of the data following compression and subsequent decompression. However, tests have shown that applying the principles described above, the distortion due to the lossy compression is perceptually transparent.

The effects of the compression noise were evaluated using standard sonic processing applied to both the raw and compressed data. Time-domain and frequency-domain analyses show that the effects of lossy compression are negligible in both the time and frequency domains. Similar results were obtained for other data sets covering fast, slow, and very slow formations.

Because of the large number of transmitters and receivers on certain logging tools, a large number of waveforms are recorded at each depth. A DLIS file generated by one tool run can be enormous, hence consuming a vast amount of memory. It can also be a serious problem for data delivery, especially if remote processing is considered and data has to be sent through a communication channel with limited bandwidth. The DLIS files from a logging tool are mainly sensor waveforms, so applying compression to them can reduce the file size considerably.

Figure 15:
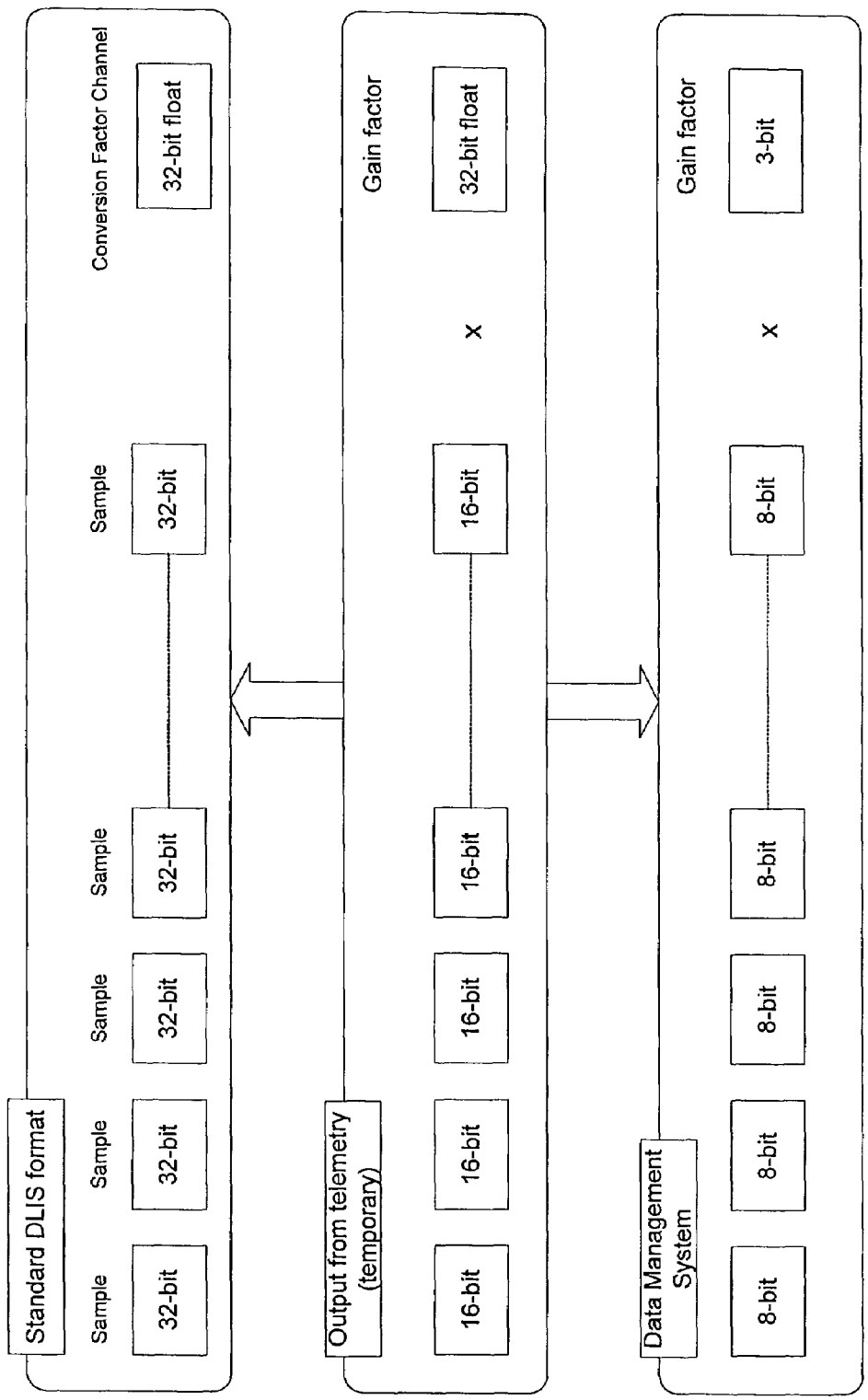
FIG. 15 is a block diagram illustrating conversion of measurement data to standard DLIS files as opposed to compressed files according to methods of the present invention.

Therefore, using compression as described herein, the DLIS file size can be compressed by up to approximately 75% without any loss to the data. Before explaining the compression method in detail, the form of the DLIS files is described. According to the some logging tool architecture, waveform samples are encoded as 32-bit floating-point values. These numbers are the product of 16-bit integers and a gain correction value (32-bit floating point number). Applying a lossless compression mode as described above to the waveforms results in significantly higher compression rates. FIG. 15 shows the effects of this compression scheme on the data size.

Concerning channels other than waveforms, simple coding schemes such as differential coding or simple mapping may be used. For example, there is a gain value associated with each waveform. This gain value takes initially 32 bits. However, because there are only 8 different modes, only 3 bits are needed to uniquely describe the gain values. This translates into a compression rate of more than 90 percent for the gain channel.

The application of principles described above provides an adaptive method for compressing sonic waveforms using time-domain modeling and efficient coding techniques. The efficiency and limited memory usage of the methods described are especially suitable for implementation in downhole software recorded on a computer readable storage device such as a disc, even for fixed-point DSP. The methods and systems facilitate high compression rates for a wide range of measurements related to subterranean formations different characteristics.

The methods and systems described herein provide a lossless compression option that achieves good compression rates while being completely reversible. The methods and systems also have several lossy modes that can achieve higher compression rates with a minimum amount of distortion. Extensive tests on numerous field data sets have proven that the compression rates achieved by variable compression significantly improves the measurement (e.g., logging) speed. Analysis also indicates that the effects of lossy compression are negligible in both the time and frequency domains according to principles of the present invention.

The preferred embodiments were chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A method of taking measurements relating to a subterranean formation, comprising automatically compressing measurements data at variable compression rates as the measurements are taken, wherein the variable compression rates comprise a combination of lossless compression and lossy compression.

2. A method of taking measurements relating to a subterranean formation according to claim 1, wherein the compression rates are varied depending on external constraints of a measurement process.

3. A method of taking measurements relating to a subterranean formation according to claim 2, wherein the external constraints comprise one or more of logging speed, drilling speed, telemetry bandwidth, and data size per distance.

4. A method of taking measurements relating to a subterranean formation according to claim 1, wherein the lossless compression comprises:
   compressing the measurements by linear predictive coding;
   compressing the measurements by differential coding;
   determining which of the linear predictive and differential coding provides higher compression;
   reporting only the higher compression measurements.

5. A method of taking measurements relating to a subterranean formation according to claim 1, wherein the lossless compression comprises:
   segmenting the measurements into smaller blocks;
   compressing the segmented blocks by linear predictive coding;
   compressing the segmented blocks by differential coding;
   determining which of the linear predictive and differential coding provides higher compression;
   reporting only the higher compression segmented blocks.

6. A method of taking measurements relating to a subterranean formation according to claim 5, wherein the segmenting comprises applying fixed-length windows to the measurements.

7. A method of taking measurements relating to a subterranean formation according to claim 5, wherein the segmenting comprises segregating different components present in the measurements.

8. A method of taking measurements relating to a subterranean formation according to claim 7, wherein the different components are segregated by detecting a first break of different components present in a waveform.

9. A method of taking measurements relating to a subterranean formation according to claim 1, wherein the lossy compression comprises quantization.

10. A method of taking measurements relating to a subterranean formation according to claim 9, wherein the quantization comprises calculating a quantization step that maximizes compression ratio while maintaining at least a predetermined signal-to-compression-noise ratio.

11. A method of taking measurements relating to a subterranean formation according to claim 1, wherein the measurements comprise logging measurements.

12. A method of taking measurements relating to a subterranean formation according to claim 1, wherein the measurements comprise logging-while-drilling measurements.

13. A method of taking measurements relating to a subterranean formation according to claim 1, wherein the measurements comprise electromagnetic or resistivity measurements.

14. A method of taking measurements relating to a subterranean formation, comprising automatically compressing measurements data at variable compression rates as the measurements are taken, wherein the variable compression rates comprise a first range of compression rates for measurement signals having an amplitude within a first range, and a second range of compression rates for measurement signals having an amplitude within a second range.

15. A method of taking measurements relating to a subterranean formation comprising applying an algorithm that automatically varies a data compression rate of the measurements relating to a subterranean formation, wherein the algorithm compresses the measurements according to two or more data compression methods in parallel and reports only data having the highest compression rate.

16. A method of taking measurements relating to a subterranean formation comprising applying an algorithm that automatically varies a data compression rate of the measurements relating to a subterranean formation, wherein the measurements comprise logging measurements and the algorithm automatically determines the data compression rate necessary to maintain a substantially constant logging rate.

17. A method of taking measurements relating to a subterranean formation comprising applying an algorithm that automatically varies a data compression rate of the measurements relating to a subterranean formation, wherein the data compression rate comprises a combination of lossless and lossy compression.

18. A method of taking measurements relating to a subterranean formation according to claim 17, wherein the lossless compression comprises:
   segmenting the measurements into blocks;
   compressing the segmented blocks by linear predictive coding;
   compressing the segmented blocks by differential coding;
   determining which of the linear predictive and differential coding provides higher compression;
   reporting only the higher compression segmented blocks.

19. A method of taking measurements relating to a subterranean formation according to claim 15, wherein the measurements comprise logging-while-drilling measurements.

20. A method of taking subterranean measurements comprising:
   (a) determining an approximate telemetry bandwidth;
   (b) assigning a minimum acceptable signal-to-compression-noise ratio;
   (c) creating multiple modes of data compression with a lossless lower mode and a lossy upper mode at extents of the multiple levels;
   (d) compressing measurements taken according to a default compression rate;
   (e) comparing a signal-to-compression-noise ratio of the compressed measurements to the minimum acceptable signal-to-compression-noise ratio;
   (f) changing the compression mode to a higher compression rate of no higher than the lossy upper mode extent if the signal-to-compression-noise ratio is above the minimum acceptable signal-to-compression-noise ratio;
   (g) changing the compression mode to a lower compression rate of no lower than the lossless lower mode extent if the signal-to-compression-noise ratio is below the minimum acceptable signal-to-compression-noise ratio.

21. A method of taking subterranean measurements according to claim 20, further comprising:
   (h) repeating steps (d)–(g) multiple times.

22. A method of taking subterranean measurements according to claim 20 wherein the measurements comprise waveforms, and further comprising repeating steps (d)–(g) for each waveform.

23. A method of taking subterranean measurements according to claim 20, wherein the multiple modes of data compression are quantized.

24. A method of taking subterranean measurements according to claim 20 wherein the default compression rate initially comprises the lossless lower mode.

25. A method of taking subterranean measurements according to claim 20, wherein at least one of the multiple compression modes comprises:
  segmenting the measurements into blocks;
  compressing the segmented blocks by linear predictive coding;
  compressing the segmented blocks by differential coding;
  determining which of the linear predictive and differential coding provides higher compression;
  reporting only the higher compression segmented blocks.

26. A method of taking subterranean measurements according to claim 20, wherein the measurements comprise one or more of: logging measurements; logging-while-drilling measurements, electromagnetic measurements, and resistivity measurements.

27. A method of taking measurements relating to a subterranean formation comprising automatically compressing measurement data at variable rates to provide data of at least a predetermined quality at a substantially constant logging speed.

28. A method of taking measurements relating to a subterranean formation according to claim 27, wherein the variable compression rates comprise at least one lossless compression rate and at least one lossy compression rate.

29. A method of taking measurements relating to a subterranean formation according to claim 28, wherein the at least one lossless compression rate is achieved by:
  segmenting the measurements into blocks;
  compressing the segmented blocks by linear predictive coding;
  compressing the segmented blocks by differential coding;
  determining which of the linear predictive and differential coding provides higher compression;
  reporting only the higher compression segmented blocks.

30. A method of taking subterranean measurements comprising:
  evaluating incoming subterranean measurement data;
  automatically determining whether or not to compress the data losslessly or lossy.

31. A method of taking subterranean measurements according to claim 30, wherein the automatically determining comprises:
  compressing the incoming subterranean measurement data at a default compression rate;
  comparing a signal-to-compression-noise ratio of the compressed data to a predetermined minimum signal-to-compression-noise ratio;
  changing the default compression rate to lossless if the signal-to-compression-noise ratio of the compressed data is less than the predetermined minimum signal-to-compression-noise ratio:
  changing the default compression rate to lossy if the signal-to-compression-noise ratio of the compressed data is greater than a sum of the predetermined minimum plus and a predetermined additional factor.

32. A method of taking measurements comprising:
  compressing measurement data with a linear predictive coding function;
  compressing the measurement data with a differential coding function;
  determining which of the linear predictive coding and differential coding functions provides higher compression;
  reporting only the higher compression data.

33. A method comprising taking measurements according to claim 32, wherein the compressing of the measurement data by the linear predictive coding and differential coding functions is performed in parallel.

34. A method comprising taking measurements according to claim 32, further comprising segmenting the measurements into blocks.

35. A method comprising taking measurements according to claim 34, wherein the segmenting comprises applying fixed-length windows to the measurements.

36. A method comprising taking measurements according to claim 34, wherein the segmenting comprises segregating different components present in the measurements.

37. A method comprising taking measurements according to claim 36, wherein the different components are segregated by detecting a first break of different components present in a waveform.

38. A method manipulating data comprising compressing the data in parallel by multiple compression methods, comparing the compressed data, and reporting only the compressed data with the highest compression rate.

39. A method of manipulating data according to claim 38, wherein the compressing by multiple compression methods further comprises:
  compressing the data by linear predictive coding; and
  compressing the data by differential coding.

40. A method of manipulating data according to claim 39, further comprising segmenting the measurements into blocks prior to compressing.

41. A system for taking measurements relating to a subterranean formation, comprising:
  a measurement tool;
  a computer in communication with the measurement tool;
  a set of instructions executable by the computer that, when executed, automatically compresses measurement data at variable compression rates as the measurements are taken, wherein the variable compression rates comprise a combination of lossless compression and lossy compression.

42. A system according to claim 41 wherein the system is a logging system, a logging-while-drilling system, an electromagnetic measurement system, or a resistivity measurement system.

43. A computer readable storage device encoding a program of instructions including instructions for:
  automatically compressing measurement data related to a subterranean formation at variable compression rates as the measurements are taken, wherein the variable compression rates comprise a combination of lossless compression and lossy compression.

* * * * *